United States Patent
Xu (10) Patent No.: US 11,910,287 B2
(45) Date of Patent: Feb. 20, 2024

(54) METHOD AND APPARATUS FOR EVENT MONITORING

(71) Applicant: Telefonaktiebolaget LM Ericsson (publ), Stockholm (SE)

(72) Inventor: Wenliang Xu, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 216 days.

(21) Appl. No.: 17/295,161

(22) PCT Filed: Oct. 30, 2019

(86) PCT No.: PCT/CN2019/114490
§ 371 (c)(1),
(2) Date: May 19, 2021

(87) PCT Pub. No.: WO2020/103662
PCT Pub. Date: May 28, 2020

(65) Prior Publication Data
US 2022/0312163 A1    Sep. 29, 2022

(30) Foreign Application Priority Data
Nov. 19, 2018 (WO) ............... PCT/CN2018/116188

(51) Int. Cl.
*H04W 4/60* (2018.01)
*H04W 4/70* (2018.01)
(Continued)

(52) U.S. Cl.
CPC ............... *H04W 4/60* (2018.02); *H04W 4/08* (2013.01); *H04W 4/70* (2018.02); *H04W 28/0215* (2013.01)

(58) Field of Classification Search
CPC ........... H04W 4/60; H04W 4/70; H04W 4/08; H04W 28/0215
See application file for complete search history.

(56) References Cited

U.S. PATENT DOCUMENTS 9,893,939 B2    2/2018   Kim et al.
2016/0277243 A1* 9/2016  Kim ..................... H04L 41/0816
(Continued)

FOREIGN PATENT DOCUMENTS

CN    101867909 A    10/2010
CN    107534833 A    1/2018
(Continued)

OTHER PUBLICATIONS

Author Unknown, "Technical Specification Group Services and System Aspects; Architecture enhancements to facilitate communications with packet data networks and applications (Release 15)," Technical Specification 23.682, Version 15.6.0, 3GPP Organizational Partners, Sep. 2018, 125 pages.
(Continued)

*Primary Examiner* — Dai Phuong
(74) *Attorney, Agent, or Firm* — Withrow & Terranova, PLLC (57) ABSTRACT

A method implemented at a network exposure node is provided. The method includes: receiving, from a first node, a first message for deleting an event subscription for at least one user equipment, UE; determining whether the at least one UE is an individual UE or a group member UE; sending a second message to a second node, when the at least one UE is a group member UE, wherein the second message includes UE identification information of the at least one UE.

18 Claims, 6 Drawing Sheets

(51) Int. Cl.
*H04W 4/08* (2009.01)
*H04W 28/02* (2009.01)

(56) References Cited

U.S. PATENT DOCUMENTS

| | | | | |
|---|---|---|---|---|
| 2018/0092133 | A1* | 3/2018 | Starsinic | H04L 67/1046 |
| 2018/0249281 | A1 | 8/2018 | McCann | |
| 2018/0270710 | A1* | 9/2018 | Hua | H04W 8/26 |
| 2019/0028337 | A1* | 1/2019 | Ryu | H04W 8/02 |
| 2019/0028866 | A1* | 1/2019 | Baek | H04W 4/70 |
| 2019/0166016 | A1* | 5/2019 | Livanos | H04L 67/61 |
| 2020/0296653 | A1* | 9/2020 | Huang | H04W 40/00 |

FOREIGN PATENT DOCUMENTS

| | | | |
|---|---|---|---|
| EP | 3386220 | A1 | 10/2018 |
| WO | 2013165168 | A1 | 11/2013 |

OTHER PUBLICATIONS

Author Unknown, "Technical Specification Group Services and System Aspects; Architecture enhancements to facilitate communications with packet data networks and applications (Release 16)," Technical Specification 23.682, Version 16.0.0, 3GPP Organizational Partners, Sep. 2018, 126 pages.

Author Unknown, "Technical Specification Group Core Network and Terminals; T8 reference point for Northbound APIs; (Release 15)," Technical Specification 29.122, Version 15.1.0, 3GPP Organizational Partners, Sep. 2018, 273 pages.

Author Unknown, "Technical Specification Group Core Network and Terminals; 5G System; Network Exposure Function Northbound APIs; Stage 3 (Release 15)," Technical Specification 29.522, Version 15.1.0, 3GPP Organizational Partners, Sep. 2018, 29 pages.

Ericsson, "S2-1907027: Dynamic management of group based event monitoring," Third Generation Partnership Project (3GPP), TSG SA WG2 Meeting #134, Jun. 24-28, 2019, 10 pages, Sappora, Japan.

International Search Report and Written Opinion for International Patent Application No. PCT/CN2019/114490, dated Jan. 14, 2020, 11 pages.

Examination Report for Indian Patent Application No. 202147026350, dated Mar. 7, 2022, 6 pages.

Ericsson, "S2-1907026: Dynamic management of group-based event monitoring," 3GPP SA WG2 Meeting #134, Jun. 24-28, 2019, Sappora, Japan, 1 page.

Extended European Search Report for European Patent Application No. 19886533.9, dated Jul. 13, 2022, 12 pages.

First Office Action for Chinese Patent Application No. 201980076035.4, dated Aug. 31, 2023, 17 pages.

* cited by examiner

METHOD AND APPARATUS FOR EVENT MONITORING

This application is a 35 U.S.C. § 371 national phase filing of International Application No. PCT/CN2019/114490, filed Oct. 30, 2019, which claims the benefit of International Application No. PCT/CN2018/116188, filed Nov. 19, 2018, the disclosures of which are incorporated herein by reference in their entireties.

TECHNICAL FIELD

The non-limiting and exemplary embodiments of the present disclosure generally relate to the technical field of communications, and specifically to methods and apparatuses for event monitoring.

BACKGROUND

This section introduces aspects that may facilitate a better understanding of the disclosure. Accordingly, the statements of this section are to be read in this light and are not to be understood as admissions about what is in the prior art or what is not in the prior art.

Currently, 3rd generation partnership project (3GPP) system supports capability exposure towards the third party service capability server (SCS)/application server (AS). For example, in fourth generation (4G) communication technology, network capability exposure to non-3GPP domain is mainly used for machine-type communication (MTC) application and service capability exposure function (SCEF) is a 3GPP node interfacing with external SCS/AS and many southbound 3GPP nodes such as home subscriber server (HSS) and mobility management entity (MME).

Event monitoring is one of the exposure functions providing various user equipment (UE) monitoring. For example, in 3GPP technical specification (TS) 23.682, the following eight events are supported by the 3GPP network. The first event is loss of connectivity, which means the SCS/AS requests to be notified when the 3GPP network detects that the UE is no longer reachable for signalling or user plane communication. The second event is UE reachability, which means the SCS/AS requests to be notified when the UE becomes reachable for sending either short messaging service (SMS) or downlink data to the UE. The third event is location reporting, which means the SCS/AS requests to be notified of the current location or the last known location of the UE. The fourth event is change of international mobile subscriber identification number (IMSI)-international mobile equipment identity (IMEI) association, which means the SCS/AS requests to be notified when the association of an ME (IMEI(SV)) that uses a specific subscription (IMSI) is changed. The term "ME" refers to mobile equipment and the term "SV" refers to software version.

The fifth event is roaming status, which means the SCS/AS queries the UE's current roaming status and requests to get notified when the status changes. The sixth event is communication failure, which means the SCS/AS requests to be notified of communication failure events. The seventh event is availability after downlink data notification (DDN) failure, which means the SCS/AS requests to be notified when the UE has become available after a DDN failure. The eighth event is number of UEs present in a geographical area, which means the SCS/AS requests to know how many UEs are in the requested area. In order to reduce the signalling when a group of UEs is required to have the same type of monitoring event, UE grouping concept is introduced in 3GPP. The third party SCS/AS and 3GPP network are both configured with an external group ID which represents a list of UEs.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide improved solutions for event monitoring, especially for deleting a previously configured Monitoring Event.

According to one aspect of the disclosure, there is provided a method implemented at a network exposure node, the method comprises receiving, from a first node, a first message for deleting an event subscription for at least one user equipment, UE. The method further comprises determining whether the at least one UE is an individual UE or a group member UE. The method further comprises sending a second message to a second node, when the at least one UE is a group member UE, wherein the second message includes UE identification information of the at least one UE.

In an embodiment of the disclosure, the UE identification information comprises External Identifier, and/or Mobile Subscriber International Integrated Services Digital Network number, MSISDN of the UE.

In an embodiment of the disclosure, the second message further includes an event subscription identifier which identifies a specific event subscription and a cancellation indication which indicates to cancel a configured event subscription for the at least one UE.

In an embodiment of the disclosure, the method further comprises when the at least one UE is an individual UE, deleting an event subscription related resource.

In an embodiment of the disclosure, the method further comprises when the cancellation indication of all the UEs in a group have been received, delete the event subscription related resource.

In an embodiment of the disclosure, wherein the determining whether the at least one UE is an individual UE or a group member UE is based on the first message, wherein the first message includes an indicator which indicates whether the UE is a group member UE.

In an embodiment of the disclosure, wherein the indicator is the External Group Identifier of the UE, and if the first message includes the External Group Identifier and the identity information of the UE, the network exposure node determines the UE is a group member UE, or else the network exposure node determines the UE is an individual UE.

In an embodiment of the disclosure, wherein the network exposure node is Service Capability Exposure Function, SCEF, or Network Exposure Function, NEF.

In an embodiment of the disclosure, the first node is Home Subscriber Server, HSS, or Home Location Register, HLR.

In an embodiment of the disclosure, the second node is Service Capability Server, SCS or Application Server, AS, or a destination node whose URL is provided by the SCS/AS before.

In an embodiment of the disclosure, the first message is Monitoring Indication message or Set Suggested Network Configuration Response message.

In an embodiment of the disclosure, the second message is HTTP POST message or Cancel Monitoring Event Request message.

According to another aspect of the disclosure, there is provided a network exposure node. The network exposure node comprises at least one processor; and at least one memory, the at least one memory containing instructions executable by the at least one processor, whereby the network exposure node is operative to receive, from a first node, a first message for deleting a event subscription for at least one user equipment, UE. The network exposure node is further operative to determine whether the at least one UE is an individual UE or a group member UE. The network exposure node is further operative to send a second message to a second node, if the at least one UE is a group member UE, wherein the second message further includes UE identification information of the at least one UE.

In an embodiment of the disclosure, the network exposure node is operative to perform the method according to the above aspect.

According to another aspect of the disclosure, there is provided a computer readable storage medium. The computer readable storage medium comprises instructions which when executed by at least one processor, cause the at least one processor to perform the method according to the above aspect.

Some advantages may be achieved by applying the proposed solution according to some embodiments of the present disclosure. For example, SCEF/NEF can notify the SCS/AS the correct information with regard to the event cancellation, the mis-operation between the SCEF and the SCS/AS can be avoid.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "network" refers to a network following any suitable wireless communication standards such as new radio (NR), future development of NR, and so on. In the following description, the terms "network" and "system" can be used interchangeably. Furthermore, the communications between two devices in the network may be performed according to any suitable communication protocols, including, but not limited to, the communication protocols as defined by some of standards organizations such as 3GPP, the International Organization for Standardization (ISO), the International Telecommunication Union (ITU), the Institute of Electrical and Electronics Engineers (IEEE), and the Internet Engineering Task Force (IETF), European Telecommunications Standards Institute (ETSI), etc. For example, the communication protocols as defined by 3GPP may comprise the fourth generation (4G), 4.5G, 5G communication protocols, and/or any other protocols either currently known or to be developed in the future.

The term "network device" refers to a network device in a communication network via which a terminal device accesses to the network and receives services therefrom. For example, in a wireless communication network such as a 3GPP-type cellular network, the network device may comprise access network device and core network device. For example, the access network device may comprise base station (BS), an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth. The core network device may comprise a plurality of network devices which may offer numerous services to the customers who are interconnected by the access network device. Each access network device is connectable to the core network device over a wired or wireless connection.

The term "terminal device" refers to any end device that can access a communication network and receive services therefrom. By way of example and not limitation, in the wireless communication network, the terminal device may refer to a mobile terminal, a user equipment (UE), a terminal device, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 1:
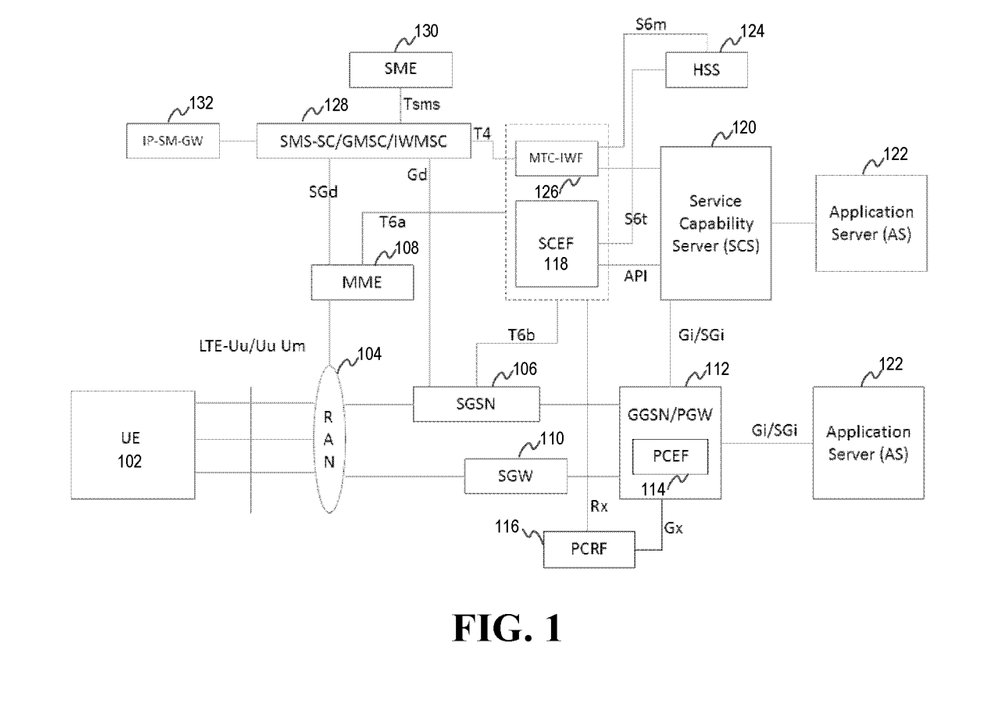
FIG. 1 is a diagram showing an exemplary wireless communication system into which an embodiment of the disclosure is applicable.

FIG. 1 is a diagram showing an exemplary wireless communication system into which an embodiment of the disclosure is applicable. As shown, the wireless communication system comprises a user equipment (UE) 102, a radio access network (RAN) 104, a serving general packet radio service (GPRS) support node (SGSN) 106, a mobility management entity (MME) 108, a serving gateway (SGW) 110, a gateway GPRS support node (GGSN)/packet data network (PDN) gateway (PGW) 112, a policy and charging rules function (PCRF) 116, a service capability exposure function (SCEF) 118, a service capability server (SCS) 120, an application server (AS) 122 and a home subscriber server (HSS) 124. The GGSN/PGW 112 comprises a policy and charging enforcement function (PCEF) 114. Note that the amount of each entity mentioned above may be more than one.

The UE 102 can communicate through a radio access communication link with the RAN 104. The UE may also be referred to as, for example, terminal device, access terminal, mobile station, mobile unit, subscriber station, or the like. It may refer to any end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmit the results of such monitoring and/or measurements to another UE and/or a network equipment. In this case, the UE may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

The RAN 104 may include, for example, an universal mobile telecommunications system (UMTS) terrestrial RAN (UTRAN), a global system for mobile communication (GSM) enhanced data rate for GSM evolution (EDGE) RAN (GERAN), and/or an evolved universal terrestrial RAN (E-UTRAN). The UTRAN and the GERAN can each include radio network controller (RNC) nodes to control communications through radio base stations providing radio access communication links to UEs that are within their respective communication service cells. The E-UTRAN can include radio base station nodes (eNodeBs) that can provide the combined functionality of the RNC nodes and base stations of the UTRAN and the GERAN. The UE 102 may communicate with the GERAN via Um interface and communicate with the UTRAN and the E-UTRAN via Uu interface.

The SGSN 106 is a core network node in the UMTS and has a user-plane function and a control-plane function. The user-plane function of the SGSN 106 can transfer user data packets of the UE 102 between the RAN 104 and the GGSN/PGW 112. The control-plane function of the SGSN 106 can carry out mobility management of the UE 102, bearer management and the like. The MME 108 is a core network node in evolved packet system (EPS) and can carry out the mobility management of the UE 102, the bearer management, and the like. The SGW 110 is a packet transfer node in the core network of the EPS. The SGW 110 can transfers user data packets of the UE 102 between the RAN 104 and the GGSN/PGW 112.

The GGSN is a core network node in the UMTS. The PGW is a core network node in the EPS. The GGSN/PGW 112 means either the GGSN or the PGW or both. The GGSN/PGW 112 is a user-plane packet transfer node in the core network and can transfer user data packets of the UE 102. The GGSN/PGW 112 can serve as a gateway to an external PDN and provide the UE 102 with the connectivity to the external PDN.

The PCEF 114 included in the GGSN/PGW 112 can carry out quality of service (QoS) control and flow based bearer charging (FBC) per service data flow of the UE 102 in accordance with a policy and charging control (PCC) rule supplied from the PCRF 116. Correspondingly, the PCRF 116 is a control-plane entity in the core network of the EPS. The PCRF 116 can determine a PCC rule to be applied to a service data flow of the UE 102 and send the determined PCC rule to the GGSN/PGW 112 having the PCEF 114. The PCRF 116 may communicate with the PCEF 114 via Gx interface.

The SCEF 118 can securely expose the services and capabilities provided by 3GPP networks by providing access to the services and capabilities through homogenous network application programming interfaces (APIs) defined by open mobile alliance (OMA), GSM alliance (GSMA) and possibly other standardization bodies. The SCEF 118 may communicate with the PCRF 116 via Rx interface, with the MME 108 via T6a interface, and with the SGSN 106 via T6b interface.

The SCS 120 can make open service access (OSA) standard interfaces accessible by application and provide an abstraction of network protocol for application developers. As a gateway between applications and the network, the SCS 120 can accomplish mapping of OSA interfaces onto network protocols and vice versa. The SCS 120 may communicate with the GGSN/PGW 112 via Gi/SGi interface and with the SCEF 118 via T8 interface. The AS 122 may be a type of server designed to install, operate and host applications and associated services for users. The AS 122 may communicate with the GGSN/PGW 112 via Gi/SGi interface. The HSS 124 is a control-plane node in the core network of 3GPP public land mobile network (PLMN) and can manage subscriber information of the UE 102. The HSS 124 may communicate with the SCEF 118 via S6t interface.

As shown in FIG. 1, the wireless communication system may further comprise a machine-type communication (MTC)-interworking function (IWF) 126, a short message service (SMS)-service center (SC)/gateway mobile switching center (GMSC)/interworking MSC (IWMSC) 128, a short message entity (SME) 70 and an Internet protocol (IP)-short message (SM)-gateway (GW) 72. It should be noted that the MME 108, the SGSN 106, the HSS 124, the PCEF 114, the PCRF 116 and the SCEF 118 are merely exemplary examples of the components in the wireless communication system and may be replaced by components with similar functionalities. For example, in fifth generation (5G) core network (CN), the MME/SGSN may be replaced by an access and mobility management function (AMF), the HSS may be replaced by a unified data management (UDM), the PCEF may be replaced by a session management function (SMF), the PCRF may be replaced by a policy control function (PCF), and the SCEF may be replaced by a network exposure function (NEF).

As described above, the Monitoring Events feature is intended for monitoring of specific events in 3GPP system and making such monitoring events information available via the SCEF. It is comprised of means that allow the identification of the 3GPP network element suitable for configuring the specific events, the event detection, and the event reporting to the authorized users, e.g. for use by applications or logging, etc. If such an event is detected, the network might be configured to perform special actions, e.g. limit the UE access. Configuration and reporting of the following monitoring events may be supported:

Monitoring the association of the UE and UICC and/or new IMSI-IMEI-SV association;
UE reachability;
Location of the UE, and change in location of the UE;
Loss of connectivity;
Communication failure;
Roaming status (i.e. Roaming or No Roaming) of the UE, and change in roaming status of the UE; and
Number of UEs present in a geographical area; and
Availability after DDN failure.

Support for Monitoring Events can be offered either via HSS, MME/SGSN or via PCRF. Based on operator policies, it shall be possible to configure Monitoring Events such that some Monitoring Event follows procedures in clause 4.5.6.2 of 3GPP TS23.682 while another Monitoring Event follows procedures in clause 4.5.6.3. SCEF shall not enable a given Monitoring Event for the same UE via both HSS/MME/SGSN, and PCRF. For the case of group based Monitoring Events, the SCS/AS (either the same SCS/AS or different SCSs/ASs) may configure a Monitor Event with different External Group Identifiers. If, in such a case, more than one External Group Identifier point to the same UE and no Group Reporting Guard Time was provided with any of the monitoring event configurations, the MME, HSS, and SCEF should not send duplicate reports of the same event for the same UE to the same destination.

Figure 2:
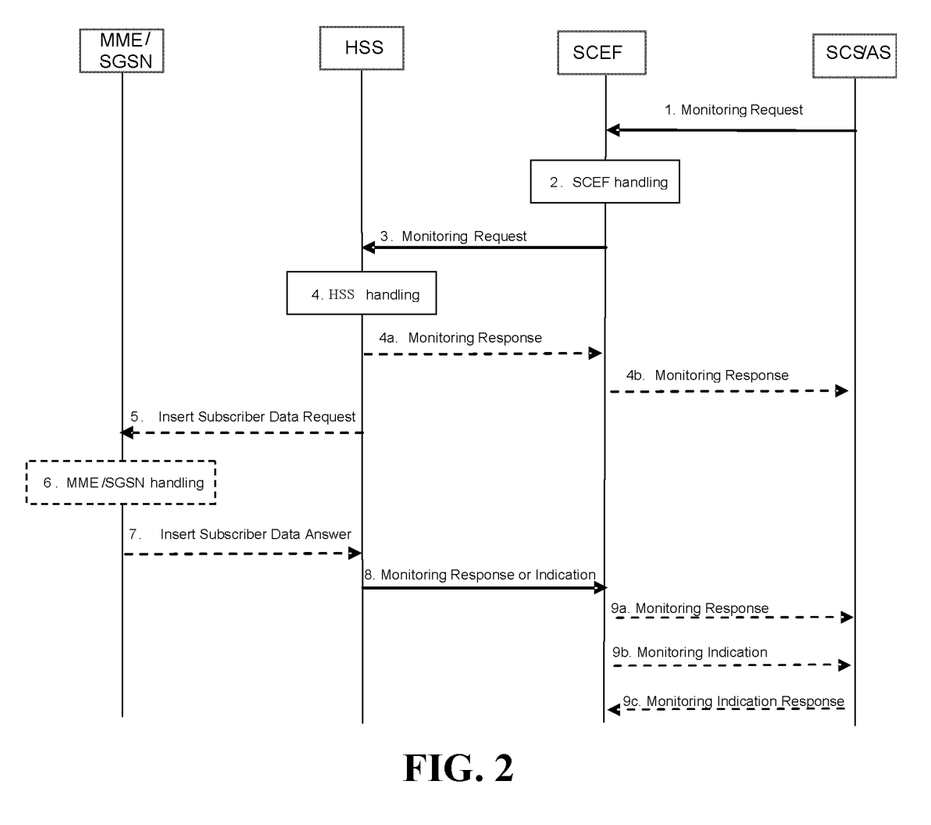
FIG. 2 shows a procedure of Monitoring Event configuration and deletion via HSS.

FIG. 2 shows the procedure of configuring monitoring at the HSS or the MME/SGSN. The procedure is common for various Monitoring Event types. Common parameters for this procedure are detailed in clause 5.6.0 of 3GPP TS23.682. The steps and parameters specific to different Monitoring Event types are detailed in clauses 5.6.1.3 to 5.6.1.9.

The procedure is also used for deleting a previously configured Monitoring Event either as a standalone procedure or together with configuring a new Monitoring Event between the same SCEF and the same SCS/AS, or replacing a previously configured Monitoring Event with a new Monitoring Event of the same type between the same SCEF and the same SCS/AS, or for one-time reporting in case the Configured Monitoring Event is available at the configured node.

One monitoring event type is called "UE reachability" and it also supports to set UE's periodic RAU/TAU timer according to SCS/AS provided Maximum Latency as described in in clause 5.6.1.4 of 3GPP TS 23.682:

UE reachability indicates when the UE becomes reachable for sending either SMS or downlink data to the UE, which is detected when the UE transitions to ECM-CONNECTED mode (for a UE using Power Saving Mode or extended idle mode DRX) or when the UE will become reachable for paging (for a UE using extended idle mode DRX). This monitoring event supports Reachability for SMS and Reachability for Data. Only a One-time Monitoring Request for Reachability for SMS is supported. The SCS/AS may include the following parameters in the Monitoring Event configuration request to the SCEF:

Reachability Type indicating whether the request is for "Reachability for SMS", or "Reachability for Data", or both.

Optionally, Maximum Latency indicating maximum delay acceptable for downlink data transfers. Maximum Latency is used for setting the periodic TAU/RAU timer for the UE as it sets the maximum period after which a UE has to connect to the network again and thereby becomes reachable. Determined by the operator, low values for Maximum Latency may deactivate PSM.

Figure 3:
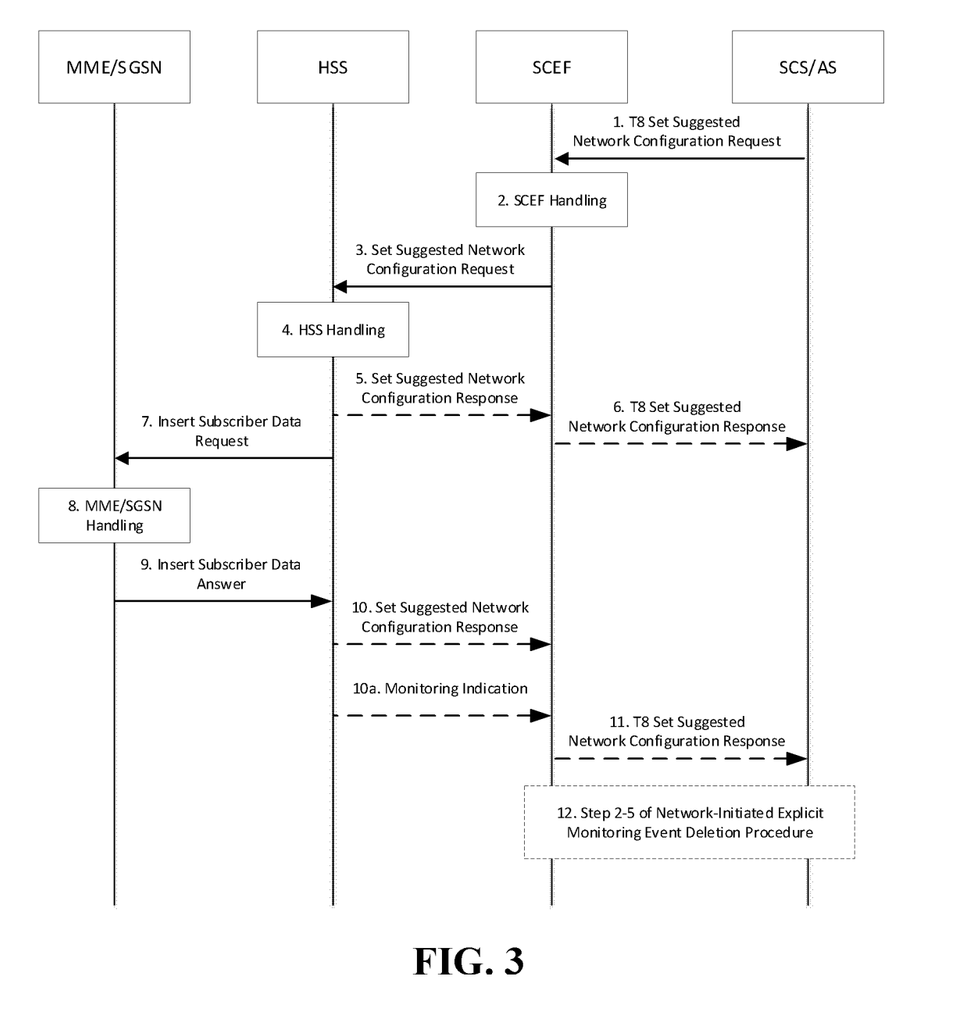
FIG. 3 shows a procedure for Network Parameter Configuration via SCEF.

FIG. 3 shows a procedure for Network Parameter Configuration via SCEF. The SCS/AS may issue network parameter configuration requests to the network, via the SCEF, to suggest parameter values that may be used for Maximum Latency, Maximum Response Time and Suggested Number of Downlink Packets, as described in in clause 5.18 of 3GPP TS 23.682. By suggesting values for these parameters, the SCS/AS may influence certain aspects of UE/network behavior such as the UE's PSM, extended idle mode DRX, and extended buffering configurations. Based on operator's configuration, the SCEF and HSS may choose to accept, reject or modify the suggested configuration parameter value. The SCEF indicates accepted/modified values to the SCS/AS. This feature can also be used to suggest parameter values for a group of UEs.

During the configuration (see FIG. 3), in step 1 of 3GPP TS23.682, 5.18, Maximum Latency can be provided by the SCS/AS, and in step 4, the HSS may decide to overwrite the periodic RAU/TAU timer which was set previously by a Monitoring Request: "If the subscribed periodic RAU/TAU timer was previously set by a Monitoring Request then, depending on operator configuration, the flow skips steps 5-9 and the HSS rejects the Network Configuration Request with an appropriate Cause indicating the failure condition or accepts the request."

Depending on whether the SCEF used in the event configuration is the same as the one used in the network parameter configuration, the HSS may send a cancellation indication in step 10:

"If the HSS cancelled Monitoring Event(s) for UE(s) in step 4 and the cancelled Monitoring Event(s) is subscribed by the SCEF which is the same as the one sending the Set Suggested Network Configuration Request at step 1, Cancelled SCEF Reference ID is included and set to the SCEF Reference ID of the cancelled Monitoring Event(s)." Or in step 10*a*:

"If the HSS cancelled a Monitoring Event(s) for UE in step 4 and the cancelled Monitoring Event(s) is subscribed by the SCEF which is different from the SCEF sending the Set Suggested Network Configuration Request at step 1, the HSS sends the Monitoring Indication message towards the SCEF which subscribed the cancelled Monitoring Event(s) and includes SCEF Reference ID of a cancelled Monitoring Event(s)."

The HSS may trigger to cancel a Monitoring Event(s) for UE which is marked with SCEF Reference ID, and send message to SCEF, but SCEF can only send cancellation notification per SCEF event subscription, It is fine if the SCEF event subscription only contains one individual UE. But it is possible that the cancelled UE is member of a UE group, then it is incorrect to cancel the whole UE group just because one UE's event is cancelled due to some reasons (e.g. subscribed periodic RAU/TAU timer overwritten).

To overcome or mitigate the above mentioned problem or other problems or provide a useful solution, the embodiments of the present disclosure propose a solution. The disclosure of 3GPP TS23.682 is incorporated by reference herein in its entirety.

Figure 4:
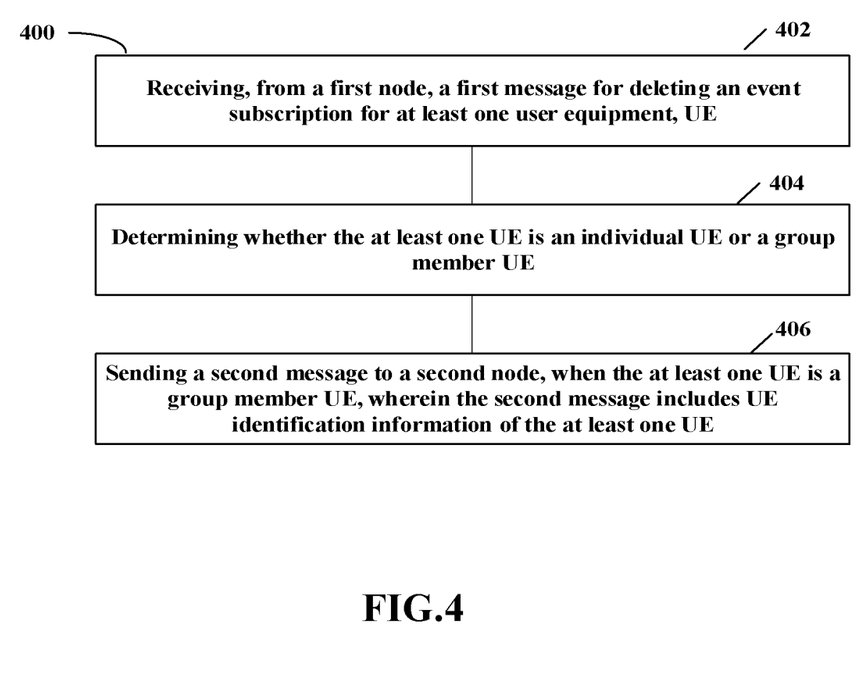
FIG. 4 is a flowchart illustrating a method implemented at a network exposure node according to an embodiment of the disclosure.

FIG. 4 shows a flowchart of a method 400 according to an embodiment of the present disclosure, which may be performed by an apparatus implemented at a network device such as the network exposure node SCEF or NEF or communicatively coupled to the network device. As such, the network device may provide means for accomplishing various parts of the method 400 as well as means for accomplishing other processes in conjunction with other components.

At block 402, the network exposure node may receive from a first node, a first message for deleting an event subscription for at least one user equipment, UE. The first node may be HSS, or HLR. Before step 402, a Monitoring Event configuration procedure has already executed successfully, but due to certain conditions, HSS may initiate a Monitoring Event Deletion procedure, for example, for a single UE, a previously set subscribed periodic RAU/TAU Timer from one SCS/AS is being overwritten by another SCS/AS, then the HSS will trigger a message towards the SCEF for deleting an event subscription for the UE and includes SCEF Reference ID of the previously accepted Monitoring Event which needs cancellation. Then SCEF will perform step 402, SCEF may receive the message for deleting the event subscription for the UE.

In an embodiment, the first message can be Monitoring Indication message or Set Suggested Network Configuration Response message. And the first message may include the SCEF Reference ID for deletion. SCEF Reference ID is a parameter created by the SCEF to associate a Monitoring Event report or a deletion of a Monitoring Event to a specific Monitoring Request and the associated context information within the SCEF. SCEF Reference ID for deletion identifies the monitoring event configuration that shall be deleted before applying the requested monitoring event configuration.

And the first message may further include the information which indicates whether the UE is a group member UE, for example the information can be the External Group Identifier (External ID) and/or the identity information of the UE, to notify the SCEF whether the UE is a member of a group or is just an individual UE.

At block 404, the SCEF may determine whether the at least one UE is an individual UE or a group member UE. In an embodiment, after the SCEF receives the first message for deleting an event subscription for the UE, the SCEF may determine whether the UE is an individual UE or a group member UE based on the information included in the first message. For example, the SCEF determines whether the first message includes the External ID and/or the identity information of the UE; if yes, then SCEF determines that the UE is a group member UE; if not, then SCEF determines it is an individual UE. The information included in the first message also can be other indication information that can indicate the UE is an individual UE, and accordingly, if the SCEF detects that indication information in the first message, it determines the UE is an individual UE; if not, then SCEF determines it is a group member UE.

In an embodiment, the SCEF may further determines T8 Long Term Transaction Reference ID (TLTRI) of the configured Monitoring Event which needs cancellation based on the SCEF Reference ID included in the first message. T8 Long Term Transaction Reference ID (TLTRI) is a parameter which refers to long term transaction (e.g. NIDD Configuration, Group Message Request, Monitoring Event configuration) between the SCEF and the SCS/AS when using T8 interface, and TLTRI is assigned by the SCEF and is unique through the duration of the transaction. It is stored on both the SCEF and the SCS/AS for the duration of the transaction.

At block 406, the SCEF may sending a second message to a second node, when the at least one UE is a group member UE, wherein the second message includes UE identification information of the at least one UE. After the SCEF determines whether the UE is an individual UE or a group member UE, the SCEF will send to the second node the second message. The information included in the second message may be different based on the determining result.

In an embodiment, the second node is the SCS/AS, or a destination node whose URL is provided by the SCS/AS during the Monitoring Event Configuration procedure.

In an embodiment, the second message may be a message sent from SCEF or NEF to SCS/AS, for example the HTTP POST message or Cancel Monitoring Event Request message.

If the SCEF determines that the UE is an individual UE, then SCEF will send the second message to the second node.

If the SCEF determines that the UE is a group member UE, then SCEF will add the UE identification information of the UE into the second message, and then send it to the second node. In one embodiment, the UE identification information of the UE may be External ID and/or MSISDN of the UE.

In an embodiment, Table 5.3.2.2.2-1 of 3GPP TS29.122 Definition of type MonitoringNotification may be revised as following.

subscription (for example: TLTRI) and/or a cancellation indication which indicates to cancel a configured event subscription (for example the indication is set to "TRUE"). Optionally, the second message may further include the cause information which indicates the reason for cancellation of the configured Monitoring Event.

In an embodiment, after step 406, the second node (e.g. SCS/AS) may receive the second message. If the second message includes the UE identification information (External ID and/or MSISDN), SCS/AS will know that the at least one UE is group member UE, SCS/AS will not delete the resources associated with the TLTRI until configured Monitoring Events of all UEs in the group are cancelled, SCS/AS will store the UE identification information, and send a response message to SCEF. If the SCS/AS determines the UE is an individual UE, then it will delete the resources associated with the TLTRI, and send a response message to SCEF. In an embodiment, the response message may be Cancel Monitoring Event Response message.

In an embodiment, SCEF may receive a response from the SCS/AS. After receiving the response, the SCEF may delete the event subscription related resource when the UE is an individual UE. The event subscription related resource may comprise the SCEF EPS (Evolved Packet System) Bearer context associated with the TLTRI.

When the UE is a group member UE, SCEF will not delete the resources associated with the TLTRI for now. In an embodiment, when SCEF detects the cancellation indication of all the UEs in a group have been received, SCEF will delete the event subscription related resource. For example, the SCEF may detect the cancellation indication of the UE in a group one after another, if the SCEF detects that the group member UE is the last one that has cancellation

| Attribute name | Data type | Cardinality | Description | Applicability (NOTE 1) |
|---|---|---|---|---|
| subscription | Link | 1 | Link to the subscription resource to which this notification is related. | |
| configResults | array(ConfigResult) | 0 . . . N | Each element identifies a notification of grouping configuration result. | |
| monitoringEventReports | array(MonitoringEventReport) | 0 . . . N | Each element identifies a monitoring event report. | |
| CancelInd | boolean | 0 . . . 1 | Indicates whether to request to cancel the corresponding monitoring subscription. Set to false or omitted otherwise. (NOTE 2) | |
| externalIds | ExternalId | 0 . . . N | Each element uniquely identifies a user. (NOTE 2) | |
| msisdns | Msisdn | 0 . . . N | Each element identifies the MS internal PSTN/ISDN number allocated for a UE. (NOTE 2) | |

(NOTE 1):
Properties marked with a feature as defined in subclause 5.3.4 are applicable as described in subclause 5.2.7. If no features are indicated, the related property applies for all the features.
(NOTE 2):
"externalIds" or "msisdns" may be included if "cancelInd" is set to "TRUE". Inclusion of either "externalIds" or "msisdns" means the cancellation is for individual group member UE(s). Omission of both "externalIds" and "msisdns" means the cancellation is for the whole monitoring subscription.

MonitoringNotification: This data type represents a monitoring notification which is sent from the SCEF/NEF to the SCS/AS or AF. This data type can be included in the second message.

In the table above, two attributes are added: externalIds and msisdns.

The second message sent from SCEF (no matter the UE is a group member or an individual UE) may include an event subscription identifier which identifies a specific event indication in the group, the SCEF will delete the "Monitoring Event Subscription" related resource.

As the solution described above, the invention fixes the event cancellation notification issue to avoid mis-operation between the SCEF and the SCS/AS.

Figure 5:
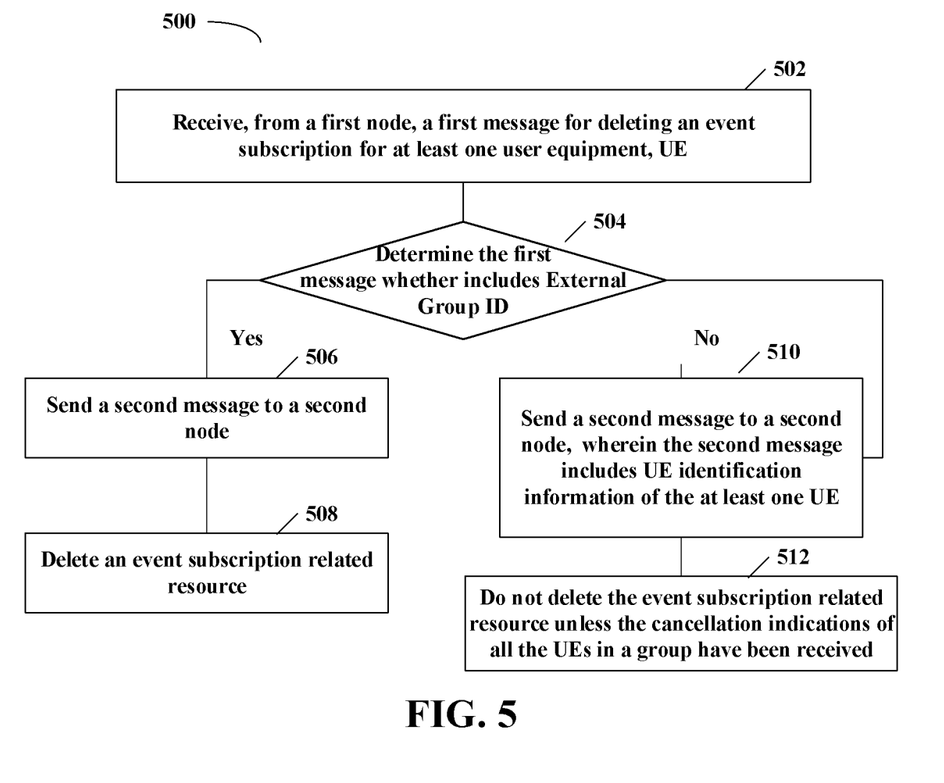
FIG. 5 is a flowchart illustrating a method implemented at a network exposure node according to another embodiment of the disclosure.

FIG. 5 shows a flowchart of a method 500 according to an embodiment of the present disclosure, which may be performed by an apparatus implemented at a network device such as the network exposure node SCEF or NEF or communicatively coupled to the network device. As such, the network device may provide means for accomplishing various parts of the method 500 as well as means for accomplishing other processes in conjunction with other components. For some parts which have been described in the above embodiments, detailed description thereof is omitted here for brevity.

At block 502, the network exposure node may receive from a first node, a first message for deleting an event subscription for at least one user equipment, UE. The first message may further include the information which indicates whether the UE is a group member UE, for example the information can be the External Group Identifier (External ID) and/or the identity information of the UE, to indicate the UE is a member of a group or is just an individual UE.

At block 504, the SCEF may determine whether the at least one UE is an individual UE or a group member UE. In an embodiment, after the SCEF receives the first message for deleting an event subscription for the UE, the SCEF may determine whether the UE is an individual UE or a group member UE based on the information included in the first message. If the SCEF determines that the UE is an individual UE, the step will go to step 506, if the SCEF determines that the UE is a group member UE, the step will go to step 510.

At block 506, SCEF sends the second message to the second node.

At block 508, SCEF deletes the subscription related resource.

At block 510, SCEF sends a second message to a second node, wherein the second message includes UE identification information of the at least one UE.

At block 512, SCEF do not delete the event subscription related resource unless the cancellation indications of all the UEs in a group have been received.

Figure 6:
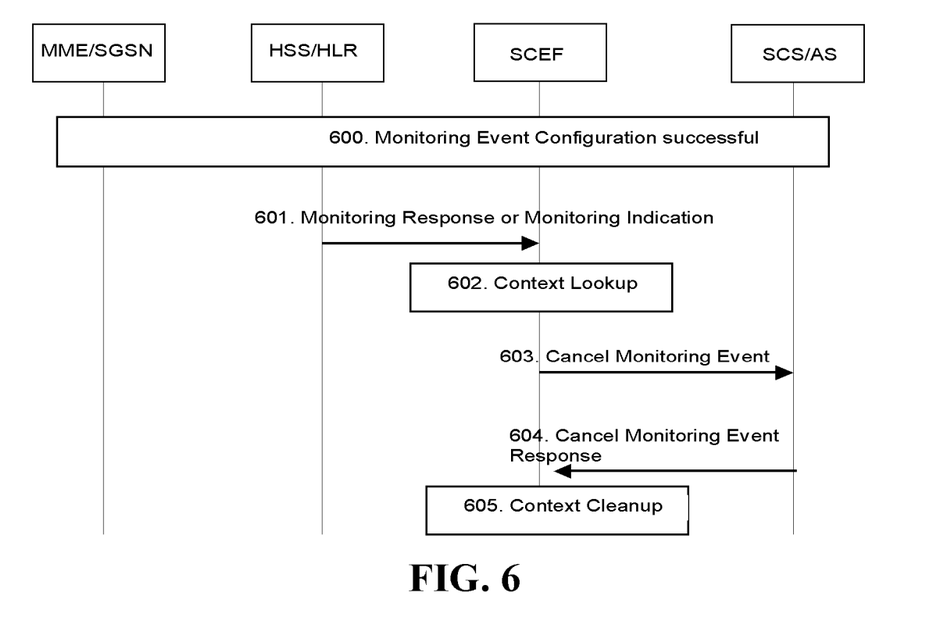
FIG. 6 shows a flowchart of Monitoring Event Deletion Procedure according to an embodiment of the present disclosure.

FIG. 6 shows a flowchart of a method 600 according to an embodiment of the present disclosure.

Step 600, a Monitoring Event configuration procedure has already executed successfully.

Step 601, due to certain conditions (e.g. for a single UE, a previously set subscribed periodic RAU/TAU Timer from one SCS/AS is being overwritten by another SCS/AS) HSS triggers a Monitoring Response message or Monitoring Indication message towards the SCEF and includes SCEF Reference ID of a previously accepted Monitoring Event which needs cancellation. The Monitoring Response message or Monitoring Indication message may further include the External Group Identifier (External ID) and/or the identity information of the UE, to indicate the UE is a member of a group or is just an individual UE.

Step 602, based on the SCEF Reference ID for cancellation included in step 601, the SCEF determines TLTRI of the configured Monitoring Event which needs cancellation. SCEF, SCEF determine whether the UE is an individual UE or a group member UE based on the information included in the received message. SCEF determine whether the first message includes the External ID and/or the identity information of the UE; if yes, then SCEF determines that the UE is a group member UE; if not, then SCEF determines it is an individual UE.

Step 603, SCEF sends a Cancel Monitoring Event Request (TLTRI, Cause) message to the T8 Destination Address. Cause value indicates the reason for cancellation of the previously configured Monitoring Event. If the SCEF determines that the UE is a group member UE, External ID and/or MSISDNS of the UE will be further included in the Cancel Monitoring Event Request message.

Step 604, the SCS/AS sends a Cancel Monitoring Event Response (Cause) message to the SCEF. Cause indicates the result of the procedure. If the Cancel Monitoring Event Request message includes the UE identification information (External ID and/or MSISDN), SCS/AS will know that the at least one UE is group member UE, SCS/AS will not delete the resources associated with the TLTRI until configured Monitoring Events of all UEs in the group are cancelled, SCS/AS will store the UE identification information, and send Cancel Monitoring Event Response message to SCEF. If the SCS/AS determines the UE is an individual UE, then it will delete the resources associated with the TLTRI, and send Cancel Monitoring Event Response message to SCEF.

Step 605, the SCEF deletes T8 context and the SCEF EPS Bearer context associated with the TLTRI sent in step 3 when the UE is an individual UE. When the UE is a group member UE, SCEF will not delete the resources associated with the TLTRI for now.

Figure 7:
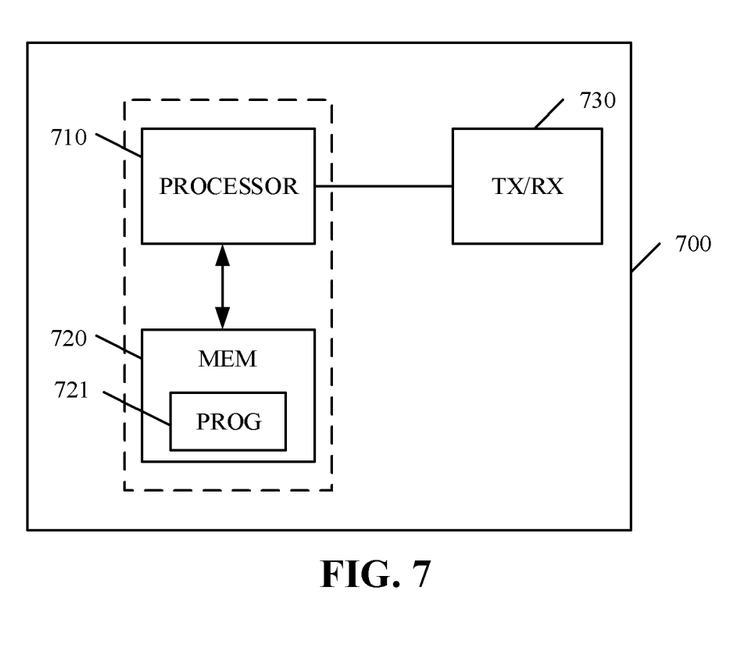
FIG. 7 illustrates simplified block diagrams of an apparatus according to an embodiment of the present disclosure.

Reference is now made to FIG. 7, which illustrates a schematic block diagram of an apparatus 710 implemented at a network exposure node. The apparatus 710 is operable to carry out any of the exemplary methods 400, 500 and possibly any other processes or methods.

FIG. 7 is a block diagram showing an apparatus suitable for use in practicing some embodiments of the disclosure. For example, any one of the network exposure node, the subscriber management node, the mobility management node and the policy decision node described above may be implemented through the apparatus 700. As shown, the apparatus 700 may include a processor 710, a memory 720 that stores a program 721, and a communication interface 730 for communicating data with other external devices through wired and/or wireless communication.

The program 721 includes program instructions that, when executed by the processor 710, enable the apparatus 700 to operate in accordance with the embodiments of the present disclosure, as discussed above. That is, the embodiments of the present disclosure may be implemented at least in part by computer software executable by the processor 710, or by hardware, or by a combination of software and hardware.

The memory 720 may be of any type suitable to the local technical environment and may be implemented using any suitable data storage technology, such as semiconductor based memory devices, flash memories, magnetic memory devices and systems, optical memory devices and systems, fixed memories and removable memories. The processor 710 may be of any type suitable to the local technical environment, and may include one or more of general purpose computers, special purpose computers, microprocessors, digital signal processors (DSPs) and processors based on multi-core processor architectures, as non-limiting examples.

According to an aspect of the disclosure it is provided a computer-readable storage medium storing instructions which when executed by at least one processor, cause the at least one processor to carry out any of the methods related to the network exposure node as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at a network exposure node, the method comprising:
   receiving, from a first node, a first message for deleting an event subscription for at least one user equipment, UE;
   determining from the first message whether the at least one UE is an individual UE or a group member UE; and
   sending a second message to a second node, wherein
      if the at least one UE is determined to be a group member UE, the second message includes UE identification information of the at least one UE and an event related subscription is not deleted; and
      if the at least one UE is determined to be an individual UE, the method further comprises deleting the event related subscription.

2. The method according to claim 1, wherein the UE identification information comprises External Identifier, and/or Mobile Subscriber International Integrated Services Digital Network number, MSISDN of the UE.

3. The method according to claim 1, wherein the second message further includes an event subscription identifier which identifies a specific event subscription and a cancellation indication which indicates to cancel a configured event subscription for the at least one UE.

4. The method according to claim 1, the method further comprises:
   when the cancellation indication of all the UEs in a group have been received, delete the event subscription related resource.

5. The method according to claim 1, wherein the determining whether the at least one UE is an individual UE or a group member UE is based on the first message, wherein the first message includes an indicator which indicates whether the UE is a group member UE.

6. The method according to claim 5, wherein the indicator is External Group Identifier of the UE, and
   if the first message includes the External Group Identifier, the network exposure node determines the UE is a group member UE,
   or else the network exposure node determines the UE is an individual UE.

7. The method according to claim 1, wherein the network exposure node is Service Capability Exposure Function, SCEF, or Network Exposure Function, NEF.

8. The method according to claim 1, wherein the first node is Home Subscriber Server, HSS, or Home Location Register, HLR.

9. The method according to claim 1, wherein the second node is Service Capability Server, SCS or Application Server, AS, or a destination node whose Uniform Resource Locator, URL, is provided by the SCS/AS before.

10. The method according to claim 1, wherein the first message is Monitoring Indication message or Set Suggested Network Configuration Response message.

11. The method according to claim 1,
    wherein the second message is a Hyper-Text Transfer Protocol POST message or Cancel Monitoring Event Request message.

12. A network exposure node, comprising:
    at least one processor; and at least one memory, the at least one memory containing instructions executable by the at least one processor, whereby the at least one processor is operative to:
- receive, from a first node, a first message for deleting an event subscription for at least one user equipment, UE;
- determine from the first message whether the at least one UE is an individual UE or a group member UE; and
- send a second message to a second node, wherein
  - if the at least one UE is determined to be a group member UE, the second message includes UE identification information of the at least one UE and an event related subscription is not deleted; and
  - if the at least one UE is determined to be an individual UE, the processor is further operative to delete the event related subscription.

13. The network exposure node according to claim 12, wherein the UE identification information comprises External Identifier, and/or Mobile Subscriber International Integrated Services Digital Network number, MSISDN of the UE.

14. The network exposure node according to claim 12, wherein the second message further includes an event subscription identifier which identifies a specific event subscription and a cancellation indication which indicates to cancel a configured event subscription for the at least one UE.

15. The network exposure node according to claim 12, wherein the at least one processor is further operative to, when the cancellation indication of all the UEs in a group have been received, delete the event subscription related resource.

16. The network exposure node according to claim 12, wherein to determine whether the at least one UE is an individual UE or a group member UE is based on the first message, wherein the first message includes an indicator which indicates whether the UE is a group member UE.

17. The network exposure node according to claim 16, wherein the indicator is an External Group Identifier of the UE, and
- if the first message includes the External Group Identifier, the at least one processor network exposure node determines the UE is a group member UE,
- or else the at least one processor determines the UE is an individual UE.

18. A non-transitory computer readable storage medium comprising instructions which when executed by at least one processor, cause the at least one processor to:
- receive, from a first node, a first message for deleting an event subscription for at least one user equipment, UE;
- determine from the first message whether the at least one UE is an individual UE or a group member UE; and
- send a second message to a second node, wherein
  - if the at least one UE is determined to be a group member UE, the second message includes UE identification information of the at least one UE and an event related subscription is not deleted; and
  - if the at least one UE is determined to be an individual UE, the processor deletes the event related subscription.

* * * * *